March 10, 1964 T. F. NEWKIRK 3,124,772

NEGATIVE RESISTANCE DEVICES

Filed Nov. 20, 1961 2 Sheets-Sheet 1

INVENTOR.
TERRY F. NEWKIRK
BY Joseph G. Werner
ATTORNEY

NEGATIVE RESISTANCE DEVICES

Filed Nov. 20, 1961 2 Sheets-Sheet 2

INVENTOR.
TERRY F. NEWKIRK
BY Joseph G. Werner
ATTORNEY

United States Patent Office 3,124,772

Patented Mar. 10, 1964

3,124,772

NEGATIVE RESISTANCE DEVICES

Terry F. Newkirk, Madison, Wis., assignor to Trionics Corporation, a corporation of Illinois Filed Nov. 20, 1961, Ser. No. 153,413
13 Claims. (Cl. 338—22)

This invention relates to electronic resistance devices, and more particularly, to methods of forming negative resistance devices within solid insulating materials and to the negative resistance devices thus formed.

Prior to my invention a number of negative resistance devices have been developed, including point contact devices of the type shown by Ohl, U.S. Patent No. 2,469,569, multijunction diodes and tunnel diodes. These prior devices all utilize conventional semiconductor materials such as germanium and/or silicon, which require the use of doping procedures. It can be seen from the Ohl patent that the described point contact negative resistance device requires the use of a high purity silicon material, which must be initially doped with aluminum or boron, sliced and polished to an optical polish and heat treated for an extensive period to oxidize the surface. In addition, use of the Ohl negative resistance device requires special holders to maintain the element in an evacuated atmosphere and to hold a contact point against the polished surface. If the Ohl point contact device is not used in an evacuated atmosphere, it is further necessary to stabilize the conditions at the point contact by applying a sealing and protective coating of wax while the device is under a high vacuum.

It is, therefore, a primary object of my invention to provide a negative resistance device which can be quickly and easily produced from a variety of normally insulating, high resistance semiconductive or dielectric materials which need not be of a high purity.

It is a further object of my invention to provide a negative resistance device which may be produced and marketed at a very low cost.

Another object of my invention is to provide a negative resistance device which may be used in a wide variety of non-reducing atmospheres, including air, and to which hook up can easily be made in a conventional manner.

It is a further object of my invention to provide an inexpensive negative resistance device which is especially well adapted for miniaturization.

It is a still further object of my invention to provide a method of forming a semiconductive path through a homogeneous dielectric material, which path will posses a negative resistance characteristic when voltages above a desired critical value are impressed across said path.

It is an additional object of my invention to provide a simple and inexpensive method of producing a negative resistance device from inexpensive materials, which method is readily adaptable to low cost, mass production techniques.

Other objects and advantages will be readily apparent from the following detailed description taken in conjunction with the accompanying drawings wherein a preferred embodiment and method of my invention has been selected for exemplification.

Figures 1, 2, 3, 4, 5, 7, 8:
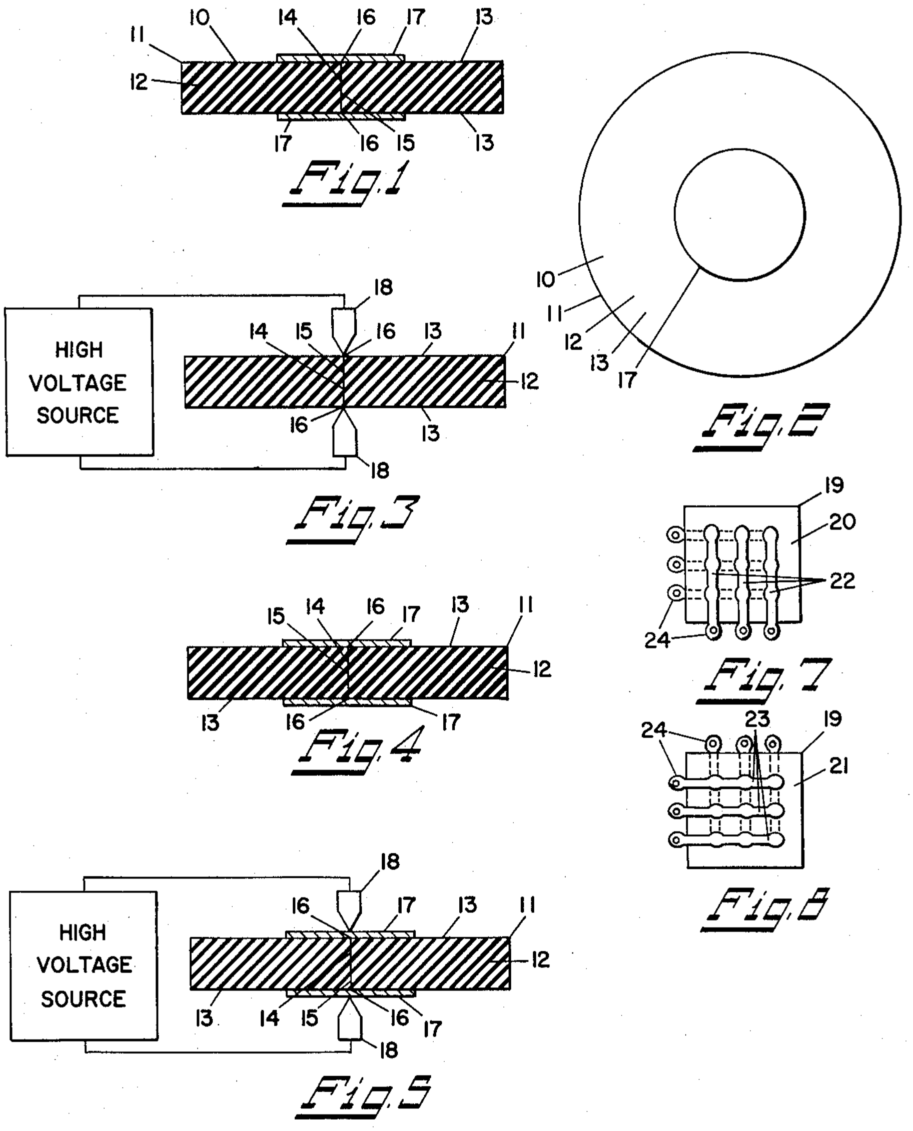
FIG. 1 is a sectional front view of a negative resistance device of my invention.
FIG. 2 is a top elevation view of the negative resistance device of FIG. 1.
FIG. 3 is a sectional view of a homogeneous dielectric wafer during the initial breakdown step of the preferred method of my invention.
FIG. 4 is a sectional view of the wafer shown in FIG. 3 after the conductive coatings have been applied.
FIG. 5 is a sectional view of the wafer shown in FIG. 4 during the secondary breakdown step of my preferred method.
FIG. 7 is a front view of a multiple negative resistance element of my invention.
FIG. 8 is a rear view of the multiple negative resistance device of FIG. 7.

Referring more particularly to the drawings in which like numbers refer to like parts, FIG. 1 shows a negative resistance device 10 of my invention. The preferred device 10 consists of a wafer 11 consisting of a matrix of normally insulating material 12. The wafer 11 may be formed in a variety of shapes as long as it includes a thin section preferably having substantially parallel surfaces 13. A semiconductive path 14, consisting of breakdown products 15 formed from the normally insulating material 12 by the application of potentials across the parallel surfaces of the wafer in accordance with my novel method to be described later, extends through the wafer 11 in imbedded relation and substantially perpendicular to the parallel surfaces 13. The ends 16 of the path 14 terminate at the parallel surfaces 13, which may have conductive coatings 17 thereon in communication with the ends 16 of the semiconductive path 14, as shown.

Figure 9:
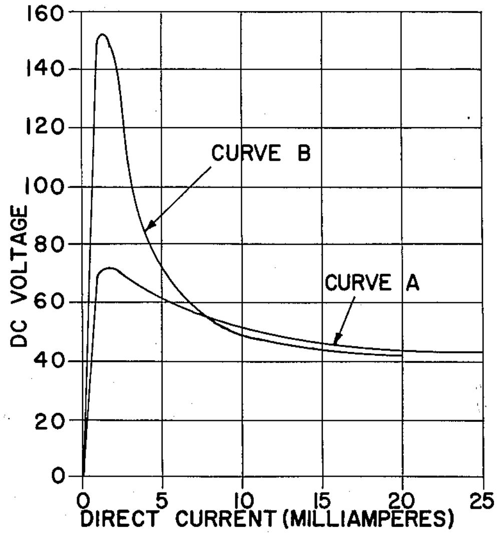
FIG. 9 is a graph illustrating the D.C. voltage-current curves of two of my negative resistance devices.

FIG. 9 shows the static D.C. voltage-current curves for two negative resistance devices of the present invention and illustrates the general electriacl resistance characteristics of such negative resistance elements produced by my method. These curves show that as potentials are applied across the ends of the semiconductive path and the current is increased, a positive resistance is first encountered, with the voltage increasing together with the current, until a critical voltage is reached. As the current is increased beyond the current value at that critical voltage the voltage begins to decrease. The portion of the curves over which the voltage drops as the current increases illustrates the negative resistance characteristic of my devices. The different peak voltage values of the devices illustrated by curves A and B is due to variations in the method of producing the devices, which will be more fully explained as the description progresses. Negative resistance elements may be produced by my method having widely varying peak voltages.

The normally insulating, high resistance, semiconductive or dielectric material 12 which forms the main body of the wafer 11 may be any one of a number of single crystal or polycrystalline matrix materials. The essential characteristic appears to be that the breakdown products formed during the electroprocessing of the material in accordance with my method form a semiconductive path having a relatively high negative temperature coefficient of resistance. The following list of suitable materials is included for illustrative purposes only and is not to be considered exclusive: nickel ferrite, magnesium manganese ferrite, barium titanate, barium strontium titanate, lead titanate, lead zirconate, titanium dioxide and glass substrata.

When a potential is applied across the ends 16 of the semiconductive path 14 of my negative resistance device 10, heating caused by power losses will occur. The heat so produced will, in turn, produce a lower resistance in the breakdown products 15 which form the semiconductive path 14, due to the above described negative temperature coefficient of resistance of the semiconductive breakdown products 15. As a result, more current will pass for a given applied voltage than would be the case in the absence of heating, and the voltage-current curve will be non-ohmic. As more current passes, more heat is produced and the resistance is lowered still further. Since the negative temperature coefficient of resistance of the breakdown products 15 is relatively high, the voltage across the semiconductive path will be lower at some high values of current than at lower current values. The device is therefore said to possess a negative resistance characteristic over the range of applied voltages wherein the above characteristics are observed. The term "relatively high negative temperature coefficient of resistance," as used in the present description, may, therefore, be further delineated as that degree of negative temperature coefficient of resistance which will cause the semiconductive path 14 to exhibit a negative resistance characteristic when voltages above some critical voltage are applied across the path 14.

My method of forming the novel negative resistance devices 10 of the present invention by electroprocessing techniques may be generally described as comprising the following steps:

(1) Preparation of the substantially homogeneous, normally insulating material 12 and shaping the material into the form of a wafer or similar thin section having substantially parallel surfaces.

(2) Placing the element so formed between a pair of aligned electrodes 18 in contact with the parallel surfaces 13 and supplying a high voltage pulse across the electrodes to produce an initial breakdown of the dielectric material between the electrodes 18, and, thereby provide a semiconductive path 14 therethrough. Step (2) is illustrated in FIG. 3, and is particularly important to insure the final location of the semiconductive path 14. A capacitor-operated relay or other suitable service may be used to supply the high voltage pulse.

(3) Applying the conductive coatings 17, illustrated in FIG. 4, to the surfaces 13 of the wafer 11 in contact with each end 16 of the semiconductive path 14 formed in step 2. Such conductive coatings 17 may, for example, consist of silver paint applied to the parallel surfaces 13 and fired at 760° C. for 20 minutes.

(4) Applying a second high voltage pulse to the conductive coatings to reopen the semiconductive path thereunder, which path may have been partially oxidized during the firing of the silver paint. See FIG. 5.

Figure 6:
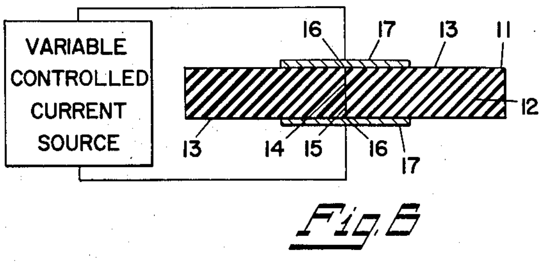
FIG. 6 is a sectional view of the wafer shown in FIG. 5 illustrating the application of a relatively large current to establish the negative resistance characteristic of my negative resistance device.

(5) Applying an electrical potential from an A.C. or D.C. source having a current control, and raising the potential to a moderately high voltage until a further breakdown of the semi-conductive path occurs. See FIG. 6.

(6) Maintaining the breakdown potential of Step 5 at a relatively high forming current for a period of time sufficient to form the negative resistance characteristic desired within the semiconductive path 14. The forming current so applied will normally be considerably in excess of that current at which the finished device is intended to be used.

The above method may be modified in several ways to produce satisfactory negative resistance devices without departing from the principles of my invention. For example, steps (2)–(4) may be eliminated in favor of the method taught in the copending patent application, SN 861,831 now Patent No. 3,056,938, of Pappis et al. to form the initial breakdown path.

In accordance with such a modified method, the conductive coatings 17 would first be applied to the wafer 11 formed in Step (1). The wafer 11 would then be placed between electrodes in contact with the conductive coatings 17 and a D.C. voltage applied across the electrodes. The D.C. voltage would be gradually increased to a relatively high level (at a relatively low current) to produce a breakdown path through the wafer 11 under the conductive coatings 17. The negative resistance characteristics of the element could then be formed in accordance with steps (5) and (6) of the above-described preferred method.

Another obvious variation from the preferred method would be to eliminate steps (3) and (4) entirely to produce a device without conductive coatings 17. Since the principal function of the coatings 17 is to provide a convenient means of hooking up to the negative resistance device, the coatings are not always necessary, as, for example, where the device is to be operated between pressurized contacts.

The values of the breakdown voltages, the forming current and the length of time for which the forming current is applied will all vary depending on the specific material, size and configuration of the wafer or similar element processed and the desired negative resistance characteristics of the device formed.

With respect to the size of the wafer 11, it is pointed out that the semiconductive path itself may be microscopic in size. Representative semiconductive paths may vary from less than 0.01 millimeter to 0.5 millimeter in diameter, depending on the matrix material and the forming method used. Therefore, it is possible to have wafers of extremely small diameter and, with the formation of a small semiconductive path, still retain the advantages of my invention. Such a device is extremely well adapted to miniaturization, since the principal limitation on the minimum size of the device appears to be that imposed by handling requirements. As an example, negative resistance devices of suitable properties have been produced in accordance with my method from dielectric wafers having a diameter no larger than that of the head of an ordinary pin.

As a specific example of my method and of the negative resistance device produced thereby, consider a nickel ferrite wafer or disc prepared from a 50:50 mixture by weight of reagent-grade nickel oxide ($Ni_2O_3$) and ferric oxide ($Fe_2O_3$) in the following manner: The raw materials are first passed through a small mesh screen, dried, cooled and dry-mixed. To 300 grams of the dry mixture, 16 milliliters of a 14% solution of polyvinyl alcohol is next added with additional blending and grinding. The raw ferrite so formed is again dried and granulated, and is then formed into discs of the desired size by pressing in a steel mold at approximately 10,000 p.s.i. The ferrite discs are then fired in air in an electric furnace heated by silicon carbide (SiC) elements. The furnace is brought to a temperature of 1370° C. over a period of 12 hours and held at this temperature for 30 to 60 minutes. After firing the discs are allowed to cool for several hours in the furnace.

The foregoing method of preparation is conventional to the preparation of ceramic discs in general, and may be modified as desired for optimum results or to accommodate the preparation of other suitable dielectric matrixes.

For a ferrite disc so formed, having a thickness of approximately 0.02 inch and a diameter of approximately 0.20 inch, the initial breakdown pulse and secondary breakdown pulse are preferably of the magnitude of 15,000 volts at a very low current, normally less than one milliampere. The final breakdown of the semiconductive path will occur at an applied voltage of about 1000 volts. If a forming current of approximately 40 milliamperes D.C. at 1000 volts is passed through the ferrite disc for one second, the negative resistance device so formed will have a critical peak voltage of approximately 500 volts. A higher forming current, or applying the 40 milliampere forming current for longer periods of time, will result in a lower critical voltage peak for the device so formed. For example, in FIG. 9 a higher current was used to form the negative resistance device illustrated by curve A than was used to form the device of curve B. It can be shown that the characteristics of the finished devices produced by my method from any given dielectric material depend primarily upon the value and duration of the forming current. Although variations in the value of the breakdown pulses will have some effect on the final properties of my devices, it is the relatively large forming current which produces the negative resistance characteristic in the device, and it is that current which most directly affects the negative resistance properties of my invention.

It is possible, by the above procedure, to produce nickel ferrite negative resistance elements having critical voltage peaks from 30 to 1000 volts, with corresponding current values of between 1 and 2 milliamperes at these voltage peaks. In contrast, inspection of the above-mentioned Ohl patent indicates that the point contact negative resistance device of Ohl is a low impedance device having a peak voltage of less than 15 volts at a current of 4 milliamperes.

Referring again to FIG. 9, it can be shown that if the current is decreased very slowly in the negative resistance region the voltage first rises until the positive resistance portion is reached and then falls with the current to zero. Compare FIGURE 10, which illustrates the dynamic 60-cycle A.C. voltage-current characteristics of a negative resistance device of the same composition as those of FIG. 9. The curve represents the voltage-current characteristics for the positive portion of the A.C. signal only. This voltage-current relationship is distinguished by a hysteresis loop, with the applied voltage increasing on the upper curve of the loop and decreasing on the lower curve. It can be seen that the curve has a negative resistance portion in the upper curve and a positive resistance portion in the lower curve.

The principal cause of the hysteresis loop in the A.C. voltage-current characteristic and of the positive resistance of the lower curve appears to be the heating effect previously mentioned. As the current through the semiconductive path increases, the heating loss increases. As the heating loss increases, the temperature of the path increases and its resistance decreases. The decreased resistance causes a further increase in current, which in turn, again increases the heating loss. Due to the relatively high negative temperature coefficient of resistance of the semiconductive path, a negative resistance characteristic is therefore present. As the current is decreased, however, the temperature of the path does not decrease as rapidly due to the temperature of the surrounding dielectric material which was heated during the period of increasing current. Consequently, the resistance of the path does not increase as fast as the current decreases and the voltage is correspondingly lower than it was for the same value of increasing current. If the current is decreased slowly, the temperature lag is not apparent and the return curve will have a negative resistance. If the current is decreased rapidly, however, as in a 60 cycle A.C. circuit, the lag will be apparent and hysteresis will occur. It can also be shown that if the applied current is increased in an A.C. circuit, the voltage peak will decrease somewhat. This is also apparent due to the heating effect, since an increase in the current will correspondingly increase the average temperature of the dielectric material surrounding the semiconductive path and decrease the average resistance of the path.

In spite of the thermal effect which is apparently involved, however, relatively fast switching from the low to the high current condition can be achieved, permitting applied pulse widths as low as 15 microseconds to switch the device from the low to the high current condition. A thermal time constant $\phi$ of this order is thus indicated for the thinnest semiconductive path, and can be attributed to the fact that the path is extremely small and heating is therefore rapid.

The frequency response of my negative resistance device having a thermal time constant $\phi$ can be determined as follows: For frequencies $<<1/\phi$ the temperature of the semiconductive path can follow the A.C. signal and will exhibit a negative resistance. Therefore, it can be seen that for a semi-conductive path having a thermal time constant $\phi=15$ microseconds, my negative resistance element will exhibit a negative resistance at A.C. frequencies well above 60,000 cycles per second.

Figure 10:
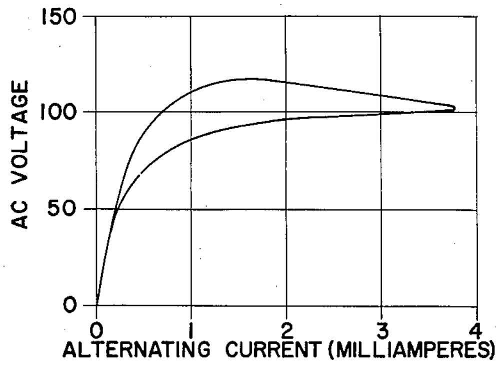
FIGS. 10 and 11 are graphs showing the dynamic 60 cycle A.C. voltage-current characteristic of two of my negative resistance devices.
Figure 11:
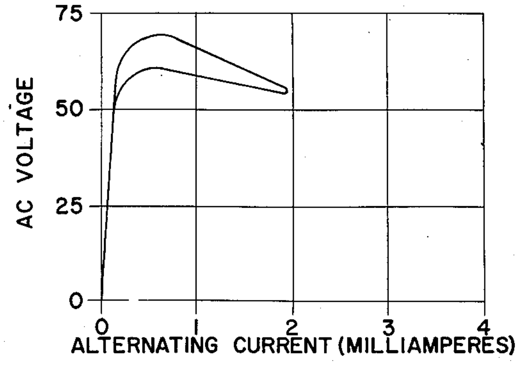

FIG. 11 represents a curve similar to that of FIG. 10, and shows the dynamic 60-cycle A.C. voltage-current characteristic of a thin nickle ferrite negative resistance device making a thickness of 0.013 inch as compared to the 0.020 inch thick device of FIG. 10. It is apparent that such a thin device has a lower voltage peak than that of the thicker device. Also, the thinner device shows not only a much sharper negative resistance characteristic in the upper curve, but also has a negative resistance in the lower curve.

My negative resistance device 10 is also affected by the ambient temperature. For example, the A.C. voltage-current characteristic for a given nickel ferrite negative resistance device at room temperature may have a voltage peak of 200 volts at a current of about 1 milliampere. It can be shown that the same device at 100° C. will have a voltage peak of approximately 120 volts at 2 milliamperes; and at 200° C. it will have a voltage peak of about 90 volts at 2.75 milliamperes. While the exact change in voltage-current characteristics with changes in temperature will vary with the device and the conditions present, the foregoing figures are indicative of the general characteristics of my negative resistance devices. Similar behavior can be demonstrated for the D.C. voltage-current characteristic of my devices.

Due to the small size of the semiconductive path 14 of my negative resistance device, it is apparent that several such paths may be formed through a single section of dielectric matrix material. The principal limitations on the number of conductive paths which may be formed through a given section of normally insulating material are those produced by the conductive coatings 17 or other means of hooking up to the device and the thickness of the matrix material through which the semiconductive paths are to be formed. It is evident that the thinner the matrix material, the closer these paths may be made to each other, without causing electrical breakdown between a path in the process of being formed and an adjacent path already formed. FIGS. 7 and 8 show one type of multiple negative resistance device 19 which may be constructed according to the principles of my invention. My multiple device 19 has a front surface 20 and a rear surface 21 shown, respectively, in FIGS. 7 and 8. The front surface 20 has a plurality of vertically disposed conductive coatings 22 and the rear surface 21 has a plurality of horizontally disposed conductive coatings 23. Connector leads 24 are attached to each conductive coating 22 and 23. Each front surface vertical conductive coating 22 is connected to each rear surface conductive coating 23 by a semiconductive path (not shown) extending therebetween substantially perpendicular to the parallel surfaces 20 and 21. It can be seen that such a multiple device 19 having three coatings on each side will have nine individual conductive paths. Since each conductive path may be formed with a different negative resistance characteristic, it is possible to obtain whichever one of the nine characteristics is desired by hooking up to the connector leads 24 which are attached to the vertical and horizontal coatings 22 and 23 joined by the conductive path having the desired characteristic. Obviously, similar multiple resistance devices could be constructed having as many conductive paths and conductive coatings as desired.

It is understood that the present invention is not confined to the particular construction and method herein illustrated and described, but embraces all such modifications thereof as come within the scope of the following claims.

I claim:

1. A continuous semiconductive path comprised of breakdown products having a relatively high negative temperature coefficient of resistance imbedded within a solid, normally insulating material from which said breakdown products were formed, the ends of said semiconductive path terminating at the surfaces of said normally insulating material, said path having a negative electrical resistance characteristic when voltages above a critical value are impressed across the ends of said semiconductive path.

2. A continuous semiconductive path comprised of breakdown products having a relatively high negative temperature coefficient of resistance, said path being imbedded in a normally insulating material from which said breakdown products were formed and having ends terminating at opposed points on substantially parallel surfaces of said material, said surfaces having conductive coatings in communication with the ends of said path, said path having a negative resistance characteristic when voltages above a critical value are impressed across said conductive coatings.

3. An electronic negative resistance device comprising:

(*a*) a matrix of normally insulating material, (*b*) a continuous semiconductive path consisting of breakdown products formed from said normally insulating material and having a relatively high negative temperature coefficient of resistance, (*c*) said semiconductive path being imbedded within and having ends terminating at the surface of said matrix material, and (*d*) said negative resistance device having a negative electrical resistance characteristic when voltages above a critical value are impressed across the ends of said semiconductive path.

4. The invention described in claim 3 wherein the normally insulating matrix material has a crystalline structure.

5. The invention described in claim 3 wherein the normally insulating matrix material is selected from the group consisting of nickel ferrite, magnesium manganese ferrite, barium titanate, barium strontium titanate, lead titanate, lead zirconate, titanium dioxide, and glass substrata.

6. A miniaturized electrical negative resistance device comprising:

(*a*) a wafer of normally insulating material, (*b*) conducting coatings on opposite sides of said wafer, (*c*) a continuous semiconductive path imbedded in said wafer to connect said conductive coatings, (*d*) said semiconductive path consisting of breakdown products formed from said normally insulating material and having a relatively high negative temperature coefficient of resistance, and (*e*) said miniaturized negative resistance device having a negative resistance characteristic when voltages above a critical value are impressed across said conductive coatings.

7. An electrical negative resistance device adapted for use in electrical circuits comprising:

(*a*) a normally insulating material having two parallel surfaces with conducting coatings on opposed portions of said surfaces, (*b*) a continuous semiconductive path extending between said conductive coatings and through said normally insulating material in generally perpendicular relation to said parallel surfaces, (*c*) said semiconductive path consisting of breakdown products formed from said normally insulating material, said breakdown products having a relatively high negative temperature coefficient of resistance.

8. An electrical negative resistance device comprising, (*a*) a wafer of normally insulating material having a pair of substantially parallel surfaces, (*b*) a plurality of continuous semiconductive paths extending through said wafer substantially perpendicular to said parallel surfaces and having ends terminating at said surfaces, (*c*) said semiconductive paths being comprised of breakdown products formed from said normally insulating material and having a relatively high negative temperature coefficient of resistance, (*d*) a plurality of conductive coatings on said parallel surfaces, (*e*) each of said conductive coatings being in communication with the ends of a plurality of said semiconductive paths, and no two conductive coatings on opposite surfaces of the wafer being in communication with the ends of more than one common semiconductive path, (*f*) said negative resistance device having a negative resistance characteristic when voltages above a critical value are impressed across any two conductive coatings on opposite surfaces of said wafer.

9. The invention described in claim 8 wherein each of said semiconductive paths has a unique negative temperature coefficient of resistance, and wherein the critical voltage is different for each pair of conductive coatings across which a voltage is impressed.

10. The method of forming a continuous semiconductive path having negative resistance characteristics for impressed voltages above a critical value through a homogeneous, normally insulating material comprising the steps of:

(*a*) shaping the normally insulating material into thin sections having substantially parallel surfaces, (*b*) placing the section so formed between a pair of aligned electrodes in contact with the parallel surfaces, (*c*) applying a high voltage pulse across said electrodes to produce an initial breakdown of the normally insulating material between the electrodes and form a semiconductive path therethrough, (*d*) placing conductive coatings over the portions of the parallel surfaces in communication with the ends of the semiconductive path, (*e*) applying a second high voltage pulse to the conductive coatings to reopen the semiconductive path, (*f*) applying a potential having a current control across said conductive coatings and raising the voltage until a further breakdown occurs along said semiconductive path, and (*g*) maintaining the applied voltage at a selected forming current for the time necessary to produce a relatively high negative temperature coefficient of resistance in the breakdown products which form the semi-conductive path.

11. The method described in claim 10 wherein:

(*a*) the homogeneous dielectric material is a polycrystalline nickel ferrite matrix, (*b*) the polycrystalline nickel ferrite matrix is shaped into sections of approximately 0.020 inch thickness, (*c*) the initial and second high voltage pulses are approximately 15,000 volts, and (*d*) the final breakdown potential is applied at a forming current of approximately 40 milliamperes D.C. for approximately one second to produce a negative resistance characteristic within the semiconductive path so formed when potentials in excess of 500 volts are applied across the conductive coatings.

12. The method of forming an electrical negative resistance device having a negative resistance characteristic for impressed potentials in excess of a critical voltage from a homogeneous, normally insulating material comprising the steps of:

(*a*) shaping the normally insulating material into thin sections having substantially parallel surfaces, (*b*) applying a high voltage pulse at opposed points on the parallel surfaces to produce an initial breakdown of the normally insulating material and form a semiconductive path therethrough, (*c*) applying a variable current potential across said semiconductive path and raising the voltage until a further breakdown occurs, and (d) maintaining the applied voltage across said path at a selected forming current for the time necessary to produce in the breakdown products which form the semiconductive path a relatively high negative temperature coefficient of resistance.

13. The method of forming an electrical negative resistance device having a negative resistance characteristic for impressed potentials in excess of a critical voltage from a homogeneous, normally insulating material comprising the steps of:

(a) shaping the normally insulating material into thin sections having substantially parallel surfaces, (b) placing conductive coatings on exposed portions of said parallel surfaces, (c) applying a high voltage breakdown potential at opposed points on the conductive coatings to produce an initial breakdown of the normally insulating material between said conductive coatings to form a semiconductive path therethrough, (d) applying a variable current potential across said conductive coatings and raising the voltage until a further breakdown occurs along the semiconductive path, and (e) maintaining the applied voltage across said conductive coatings at a selected forming current for the time necessary to produce in the breakdown products which form the semiconductive path a relatively high negative temperature coefficient of resistance.

References Cited in the file of this patent

UNITED STATES PATENTS 2,875,506 Swanson et al. ---------- Mar. 3, 1959